United States Patent
Beschorner et al.

(10) Patent No.: US 10,247,315 B2
(45) Date of Patent: Apr. 2, 2019

(54) SPOOL FOR HYDRAULIC VALVE

(71) Applicant: Caterpillar Inc., Peoria, IL (US)

(72) Inventors: Matthew J. Beschorner, Plainfield, IL (US); Matthew P. Giacomi, Joliet, IL (US); Joseph Yousef, Joliet, IL (US)

(73) Assignee: Caterpillar Inc., Deerfield, IL (US)

( * ) Notice: Subject to any disclaimer, the term of this patent is extended or adjusted under 35 U.S.C. 154(b) by 72 days.

(21) Appl. No.: 15/296,093

(22) Filed: Oct. 18, 2016

(65) Prior Publication Data

US 2018/0106387 A1    Apr. 19, 2018

(51) Int. Cl.
| | |
|---|---|
| *F16K 11/07* | (2006.01) |
| *F16K 31/06* | (2006.01) |
| *F15B 13/04* | (2006.01) |
| *F15B 1/26* | (2006.01) |

(52) U.S. Cl.
CPC ............ *F16K 11/0716* (2013.01); *F15B 1/26* (2013.01); *F15B 13/0402* (2013.01); *F16K 31/0613* (2013.01); *F15B 2211/205* (2013.01); *F16K 11/07* (2013.01); *Y10T 137/8671* (2015.04); *Y10T 137/86767* (2015.04)

(58) Field of Classification Search
CPC .. F16K 11/0716; F16K 11/07; F16K 31/0613; F15B 1/26; F15B 13/0402; F15B 2211/205; Y10T 137/8671; Y10T 137/86767
See application file for complete search history.

(56) References Cited

U.S. PATENT DOCUMENTS

| | | | | |
|---|---|---|---|---|
| 2,596,534 A | * | 5/1952 | St. Maur | F16K 5/12 137/625.12 |
| 2,930,361 A | * | 3/1960 | MacDuff | B62D 5/061 137/625.63 |
| 4,245,816 A | * | 1/1981 | Johnson | F16K 11/0708 251/282 |
| 4,411,189 A | * | 10/1983 | Miller | F15B 13/0417 137/596 |
| 4,664,152 A | * | 5/1987 | O'Mara | F15B 13/04 137/454.2 |

(Continued)

FOREIGN PATENT DOCUMENTS

JP        5783763        5/1982

*Primary Examiner* — Matthew W Jellett
*Assistant Examiner* — Christopher Ballman
(74) *Attorney, Agent, or Firm* — Hibshman Claim Construction PLLC (57) ABSTRACT

A spool for a hydraulic valve includes a cylindrical body having a first end, a second end disposed opposite the first end, and an annular wall defined by an internal surface of the cylindrical body and an external surface of the cylindrical body. The annular wall defines a plurality of holes therethrough. The internal surface defines a first chamber, a second chamber, and a slot chamber within the cylindrical body, the second chamber being in fluid communication with the plurality of holes via the first chamber, the slot chamber being located between the second chamber and the second end of the cylindrical body. The annular wall defines a slot therethrough, the slot extending from the second end of the cylindrical body toward the first end of the cylindrical body along the longitudinal direction, the slot being open at the second end of the cylindrical body along the longitudinal direction.

15 Claims, 9 Drawing Sheets

(56) References Cited

U.S. PATENT DOCUMENTS

| | | | | |
|---|---|---|---|---|
| 4,756,330 A | * | 7/1988 | Tischer | F15B 13/022 |
| | | | | 137/101 |
| 4,917,137 A | * | 4/1990 | Symmons | F16K 11/0716 |
| | | | | 137/111 |
| 6,397,890 B1 | * | 6/2002 | Mickelson | F15B 13/0402 |
| | | | | 137/625.34 |
| 7,766,041 B2 | | 8/2010 | Tackes et al. | |
| 7,913,492 B2 | * | 3/2011 | Nakano | F16H 61/425 |
| | | | | 60/489 |
| 8,191,579 B2 | * | 6/2012 | Imhof | G05D 7/0133 |
| | | | | 137/625.38 |
| 8,387,659 B2 | * | 3/2013 | Hunnicutt | F15B 13/0402 |
| | | | | 137/625.35 |
| 8,511,329 B1 | * | 8/2013 | Rickis | F02C 7/232 |
| | | | | 137/15.21 |
| 9,249,800 B2 | * | 2/2016 | Ballard | F04C 14/26 |
| 9,512,929 B2 | * | 12/2016 | Folkner | F16K 11/076 |

\* cited by examiner

SPOOL FOR HYDRAULIC VALVE

TECHNICAL FIELD

The present disclosure relates to a hydraulic valve, and more particularly to a spool of the hydraulic valve.

BACKGROUND

Hydraulic valves are widely used to control and operate various kinds of machines, such as excavators, dozers, loaders, and backhoes. Hydraulic valves include spools which are slidably disposed therein to direct hydraulic fluid through a hydraulic circuit. The hydraulic valves utilize pressure associated with the hydraulic fluid to allow sliding of the spool and, thereby, selectively activate and deactivate various actuators, such as hydraulic pistons and hydraulic motors, in the machines.

With the development in technology, hydraulic valves are equipped with hollow spools. In cases where such hollow spools are subjected to pressure of the hydraulic fluid above an acceptable range, the spools may develop stress therein. Owing to development of such stress, namely hoop stress, the spools may radially expand and may seize within the hydraulic valve. Additionally, in case of external loading, compression of the spool beyond a limit may result in spool shrinkage, which, in effect, may cause leakage within the hydraulic valve. Besides these defects caused in the spools by high pressure hydraulic fluid, high flow rates of the hydraulic fluid through the spools may cause spinning of the spool, which may damage the hydraulic valve.

U.S. Pat. No. 7,766,041 (the '041 patent) describes a fluid flow control valve for regulating fluid communication. The fluid flow control valve includes a cage defining apertures in a wall thereof, and a spool configured to an interior shape of the cage for reciprocation along a longitudinal axis of the cage. The fluid flow control valve also includes at least a pair of incremental pressure drop passages to allow incremental flow of fluid when the spool moves between a first position and a second position within the cage. Whilst such configuration, the spool of the '041 patent could experience development of hoop stress and seizure of the spool.

SUMMARY OF THE DISCLOSURE

In one aspect of the present disclosure, a spool for a hydraulic valve is provided. The spool includes a cylindrical body having a first end and a second end distal to the first end. The second end of the cylindrical body includes at least one slot configured to engage with a valve body of the hydraulic valve. The spool also includes a first chamber defined within the cylindrical body and configured to receive fluid through a plurality of holes defined in the cylindrical body. The spool also includes a second chamber defined within the cylindrical body. The second chamber is located downstream of the first chamber and in fluid communication with the first chamber. An inner diameter of the second chamber is less than an inner diameter of the first chamber. The first chamber is configured to elongate along a longitudinal axis thereof based on a pressure of the fluid received within the first chamber. Further, an outer surface of the first chamber is configured to contract based on the elongation of the first chamber.

In another aspect of the present disclosure, a hydraulic valve is provided. The hydraulic valve includes a valve body defining at least one bore, at least one pump port, at least one tank port, a first flow passage in fluid communication with the at least one pump port and the at least one bore, and a second flow passage in fluid communication with the at least one tank port and the at least one bore. The hydraulic valve also includes at least one spool slidably disposed within the at least one bore of the valve body. The at least one spool is configured to selectively communicate with the first flow passage and the second flow passage. The at least one spool includes a cylindrical body having a first end and a second end distal to the first end. The second end of the cylindrical body includes at least one slot configured to engage with the valve body of the hydraulic valve. The at least one spool also includes a first chamber defined within the cylindrical body and configured to fluidly communicate with the first flow passage via a plurality of holes defined in the cylindrical body of the hydraulic valve. The at least one spool also includes a second chamber defined within the cylindrical body. The second chamber is located downstream of the first chamber and in fluid communication with the first chamber. An inner diameter of the second chamber is less than an inner diameter of the first chamber. The first chamber is configured to elongate along a longitudinal axis thereof based on a pressure of the fluid received within the first chamber. Further, an outer surface of the first chamber is configured to contract based on the elongation of the first chamber. The hydraulic valve further includes at least one biasing member disposed within the valve body. The at least one biasing member is coupled to the first end of the cylindrical body of the at least one spool.

In yet another aspect of the present disclosure, a hydraulic system is provided. The hydraulic system includes a pump, a tank, and a hydraulic valve in fluid communication with the pump and the tank. The hydraulic valve includes a valve body defining at least one bore, a first flow passage configured to communicate with the pump via at least one pump port, and a second flow passage configured to communicate with the tank via at least one tank port. The hydraulic valve also includes at least one spool slidably disposed within the at least one bore of the valve body. The at least one spool is configured to selectively communicate with the first flow passage and the second flow passage. The at least one spool includes a cylindrical body having a first end and a second end distal to the first end. The second end of the cylindrical body includes at least one slot configured to engage with the valve body of the hydraulic valve. The at least one spool also includes a first chamber defined within the cylindrical body and configured to communicate with the first flow passage via a plurality of holes defined in the cylindrical body of the hydraulic valve. The at least one spool also includes a second chamber defined within the cylindrical body. The second chamber is located downstream of the first chamber and in fluid communication with the first chamber. An inner diameter of the second chamber is less than an inner diameter of the first chamber. The first chamber is configured to elongate along a longitudinal axis thereof based on a pressure of the fluid received within the first chamber. Further, an outer surface of the first chamber is configured to contract based on the elongation of the first chamber. The hydraulic valve further includes at least one biasing member disposed within the valve body. The at least one biasing member is coupled to the first end of the cylindrical body of the at least one spool Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
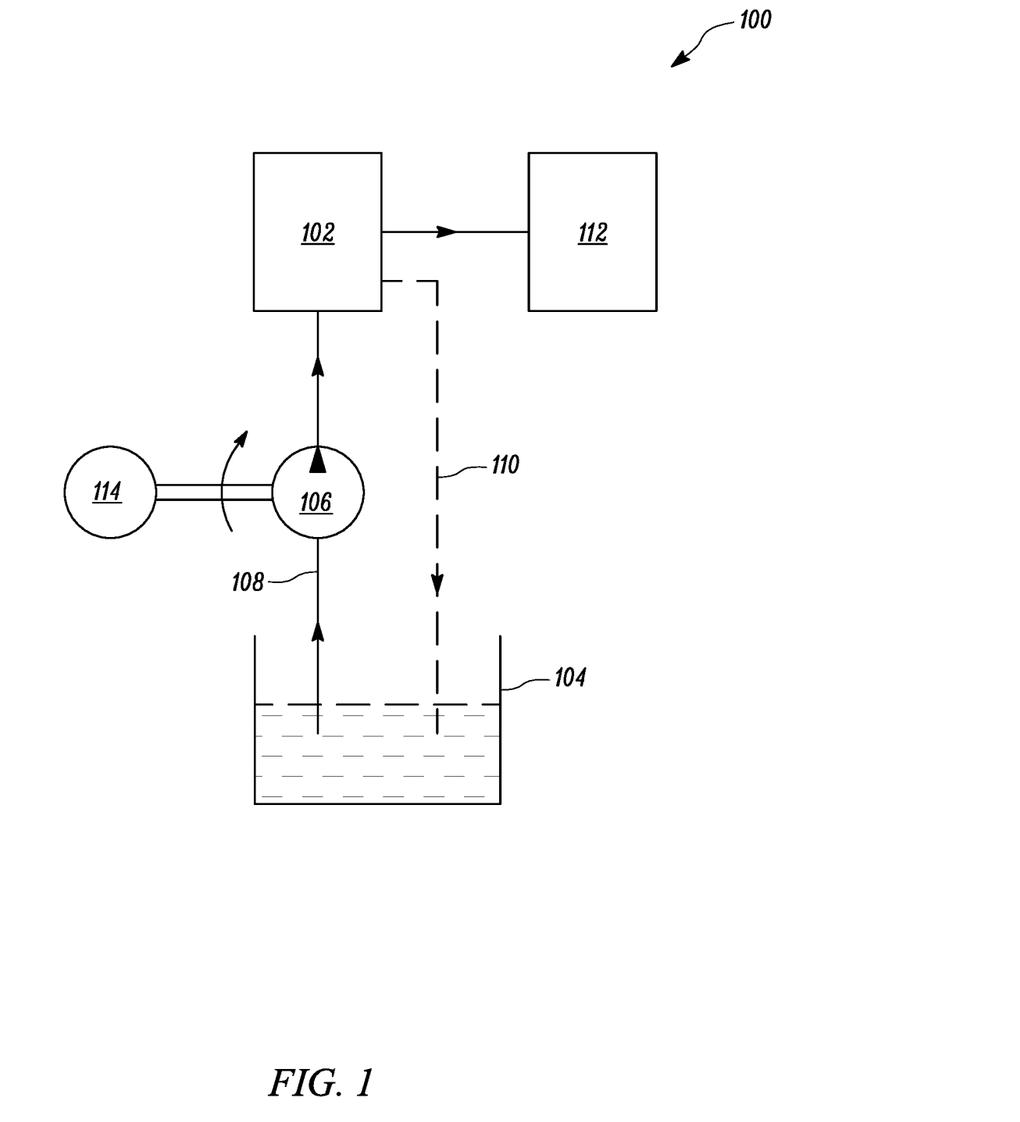
FIG. 1 is a schematic block diagram of a hydraulic system equipped with a hydraulic valve, according to an embodiment of the present disclosure.

Referring to FIG. 1, a schematic block diagram of a hydraulic system 100 equipped with a hydraulic valve 102 is illustrated. The hydraulic system 100 includes a tank 104 and a pump 106 in fluid communication with the tank 104 via a suction passage 108. The tank 104 may be embodied as a reservoir capable of storing fluid. The pump 106 is configured to draw the fluid from the tank 104 and supply the fluid to various components 112 of a machine (not shown), such as a hydraulic excavator, via the hydraulic valve 102, hereinafter referred to as the valve 102. As such, the pump 106 is disposed in fluid communication with the valve 102. For the purpose of operating the pump 106, an actuating device 114, such as an engine or a motor, is coupled to the pump 106. In an example, the components 112 can include hydraulic actuators of the hydraulic excavator. Further, the valve 102 is in fluid communication with the tank 104 via a drain passage 110 to drain any extra fluid which is not supplied to the components 112 of the machine.

Figure 2:
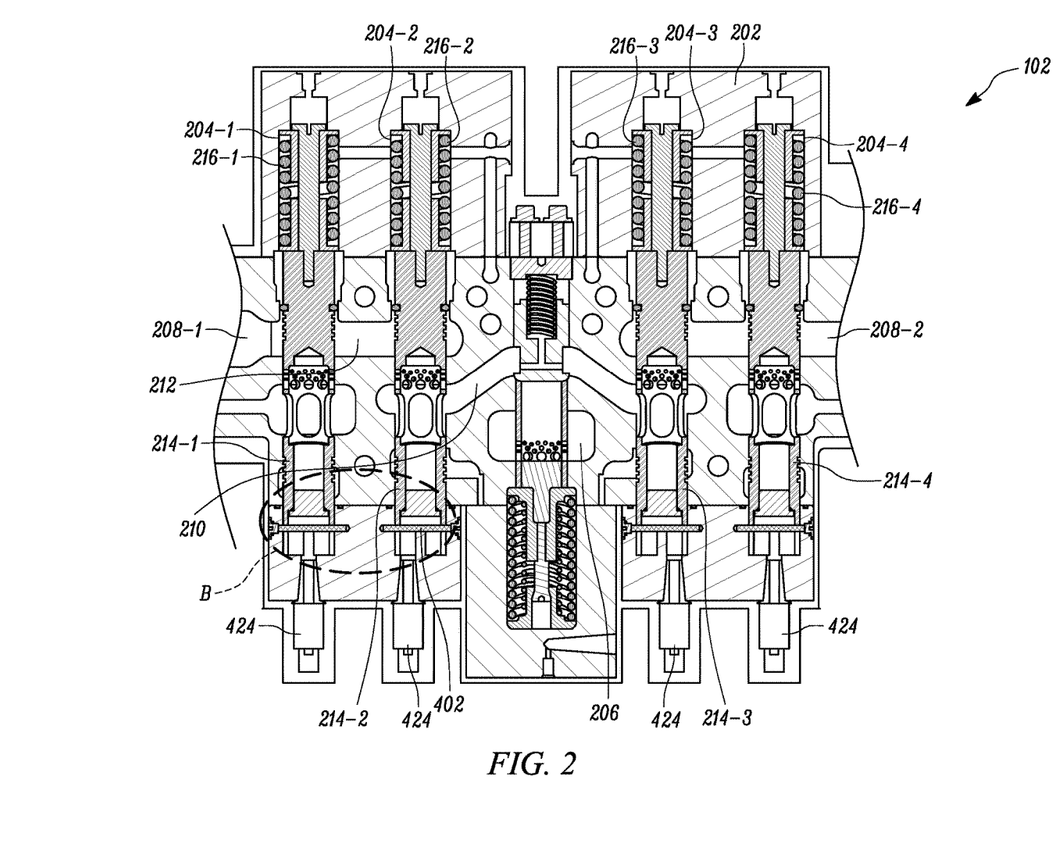
FIG. 2 is a cross-section of the hydraulic valve of FIG. 1, according to an embodiment of the present disclosure.

Referring to FIG. 2, a schematic cross-section of the valve 102 is illustrated according to an embodiment of the present disclosure. The valve 102 includes a valve body 202 which defines multiple bores, such as bores 204-1, 204-2, 204-3, and 204-4, hereinafter individually referred to as 'the bore 204' and collectively referred to as 'the bores 204' or as 'the at least one bore 204'. The valve 102 also includes at least one pump port 206 in fluid communication with the pump 106 to receive fluid into the valve 102. Further, the valve 102 includes at least one tank port, such as tank ports 208-1 and 208-2, hereinafter collectively referred to as the tank ports 208, which is in fluid communication with the tank 104 via the drain passage 110.

For the purpose of allowing flow of fluid within the valve body 202, the valve 102 includes a first flow passage 210 and a second flow passage 212. As it can be understood by a person skilled in the art, the first flow passage 210 and the second flow passage 212 may be embodied as grooves in the valve body 202 to allow flow of fluid therethrough. Size and shape of the first flow passage 210 and the second flow passage 212 may be predetermined, such that a required pressure of the fluid is maintained when the fluid flows through the first flow passage 210 and the second flow passage 212. While the first flow passage 210 is in fluid communication with the pump port 206 and the bores 204, the second flow passage 212 is in fluid communication with the tank ports 208 and the bores 204. As such, the fluid supplied by the pump 106 to the valve 102 flows to the bores 204 through the first flow passage 210 and the fluid flows out of the valve 102 from the bores 204 through the second flow passage 212. It should be understood that number of first flow passages 210 and second flow passages 212 shown in FIG. 2 do not limit the construction and design of the valve body 202. Rather, it should be appreciated that the valve body 202 of FIG. 2 is for mere purpose of illustration. Any number of the first flow passages 210 and the second flow passages 212 may individually be provided in the valve body 202 to facilitate the flow of fluid from the pump port 206 to each bore 204, and from each bore 204 to the tank port 208.

In one embodiment, the valve 102 also includes at least one spool 214 slidably disposed within the at least one bore 204 of the valve body 202. For instance, the valve 102 can include a first spool 214-1 disposed in the bore 204-1, a second spool 214-2 disposed in the bore 204-2, a third spool 214-3 disposed in the bore 204-3, and a fourth spool 214-4 disposed in the bore 204-4, as illustrated in FIG. 2. However, the valve 102 can include additional bores 204 to accommodate additional spools. The first spool 214-1, the second spool 214-2, the third spool 214-3, and the fourth spool 214-4 are collectively referred to as 'the spools 214' or as 'the at least one spool 214', and individually referred to as 'the spool 214', in the present disclosure.

Further, the valve 102 includes multiple biasing members, such as a first biasing member 216-1, a second biasing member 216-2, a third biasing member 216-3, and a fourth biasing member 216-4 coupled to the first spool 214-1, the second spool 214-2, the third spool 214-3, and the fourth spool 214-4, respectively, as shown in FIG. 2. The first biasing member 216-1, the second biasing member 216-2, the third biasing member 216-3, and the fourth biasing member 216-4, collectively referred to as 'the biasing members 216' and individually referred to as 'the biasing member 216', subjects the respective spools 214 to a preload condition. That is, the biasing member 216 applies a biasing force on the spool 214.

Figure 3:
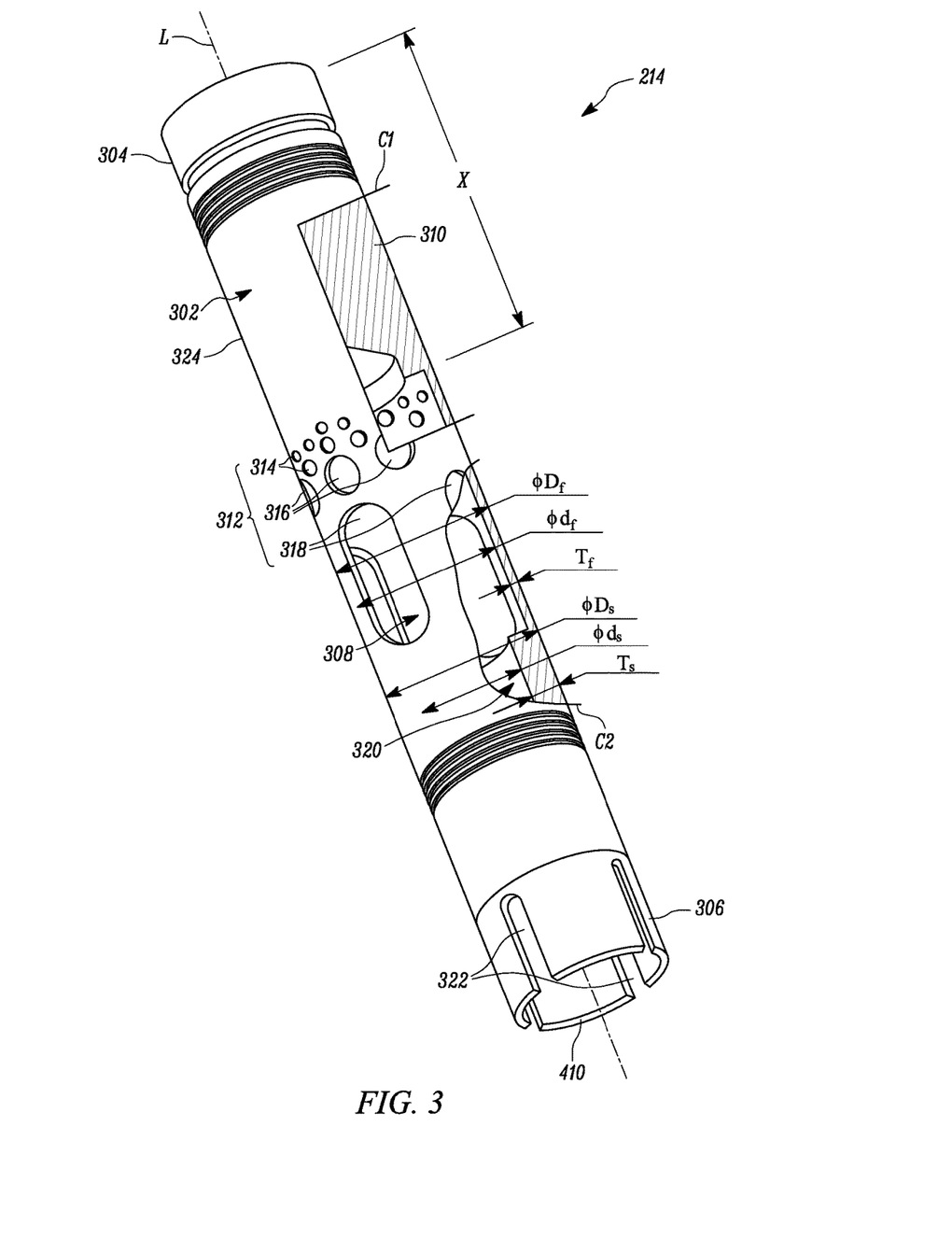
FIG. 3 is a perspective view of a spool of the hydraulic valve, according to an embodiment of the present disclosure.

Referring to FIG. 3, a perspective view of the spool 214, according to an embodiment of the present disclosure, is illustrated. The spool 214 includes a cylindrical body 302 having a first end 304 and a second end 306 distal to the first end 304. The first end 304 and the second end 306 define a length of the spool 214. The spool 214 of the present disclosure is embodied as a partial hollow structure. That is, a portion of the cylindrical body 302 is solid while remaining portion of the cylindrical body 302 is hollow.

The spool 214 also includes a first chamber 308 defined within the cylindrical body 302. In particular, the first chamber 308 is located at a predetermined distance 'X' from the first end 304 of the cylindrical body 302. The spool 214 includes an end portion 310 (shown by a cut-section C1) extending for the predetermined distance 'X' between the first end 304 of the cylindrical body 302 and the first chamber 308. In this embodiment, the end portion 310 of the spool 214 is provided as a solid portion to add to the strength of the spool 214.

The first chamber 308 is located in the hollow portion of the cylindrical body 302. The first chamber 308 has an outer diameter '$D_f$' and an inner diameter '$d_f$', which together define a thickness '$T_f$' (shown by cut-section C2) of the first chamber 308. A plurality of holes 312 is provided on a wall of the first chamber 308 and, accordingly, the first chamber 308 is configured to receive the fluid through the plurality of holes 312. Furthermore, the plurality of holes 312 includes a first set of holes 314 and a second set of holes 316 located below the first set of holes 314 along a longitudinal axis 'L' of the cylindrical body 302. Perimeter of each hole of the first set of holes 314 is less than perimeter of each hole of the second set of holes 316. In one example, each hole of the first set of holes 314 and the second set of holes 316 may be a circle. However, in some examples, shape of each hole of the first set of holes 314 can be different from that of the second set of holes 316.

The plurality of holes 312 can also include a third set of holes 318 located below the second set of holes 316. Perimeter of each hole of the second set of holes 316 could be less than perimeter of each hole of the third set of holes 318. As such, the holes 312 are formed in an order of increasing perimeter, in a direction from the first end 304 to the second end 306 of the cylindrical body 302 and along the longitudinal axis 'L' of the cylindrical body 302, in the wall of the first chamber 308.

In one embodiment, the spool 214 further includes a second chamber 320 defined within the cylindrical body 302. The second chamber 320 is located downstream of the first chamber 308 and is in fluid communication with the first chamber 308. The second chamber 320 has an outer diameter '$D_s$' and an inner diameter '$d_s$', which together define a thickness '$T_s$' (shown by the cut-section C2) of the second chamber 320. The inner diameter '$d_s$' of the second chamber 320 is less than the inner diameter '$d_f$' of the first chamber 308. As such, the thickness '$T_s$' of wall of the second chamber 320 is greater than then thickness '$T_f$' of the wall of the first chamber 308. Consequently, volume of the second chamber 320 is less than volume of the first chamber 308.

Further, the second end 306 of the cylindrical body 302 includes at least one slot 322. For instance, the second end 306 of the cylindrical body 302 can include slots 322-1, 322-2, 322-3, and 322-4, collectively and alternatively referred to as the slots 322, and individually referred to as the slot 322. In one embodiment, the slots 322 extend along the longitudinal axis 'L' of the cylindrical body 302. Additionally, the slots 322 are provided in a manner, such that two slots 322 are located diagonally opposite to each other. Although FIG. 2 illustrates four slots 322, it should be understood that the number of slots 322 are not limited.

Figure 4:
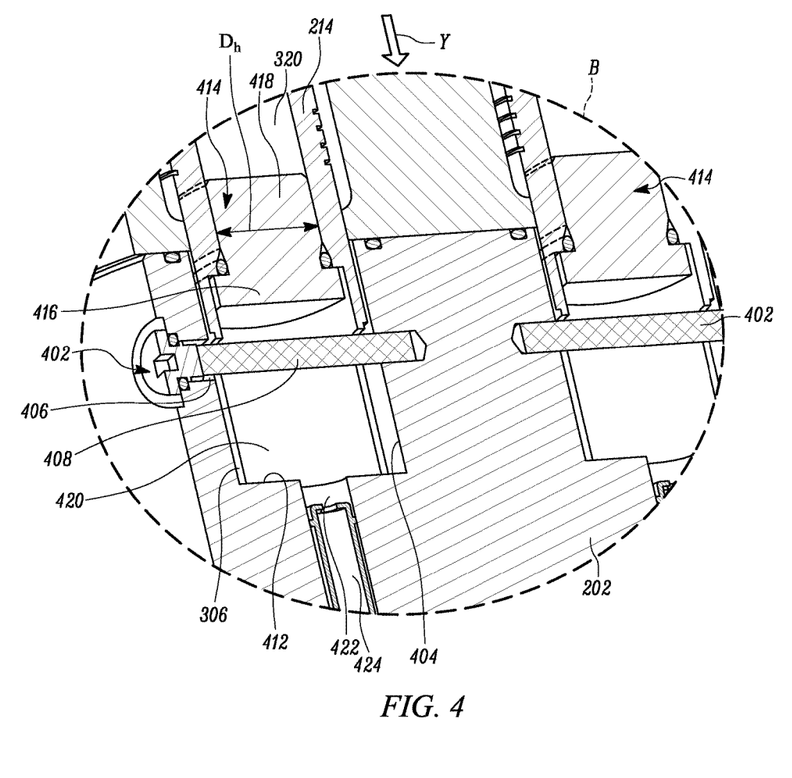
FIG. 4 is an enlarged perspective view of a portion 'B' of the hydraulic valve of FIG. 2 equipped with an anti-spin pin, according to an embodiment of the present disclosure.

Referring to FIG. 4, a perspective view of a portion 'B' (indicated in FIG. 2) of the valve 102 is illustrated. Each slot 322 at the second end 306 of the spool 214 is configured to engage with the valve body 202 of the valve 102. In some embodiments, an anti-spin pin 402 may be provided in the valve body 202. The anti-spin pin 402 may either be a separate component coupled to the valve body 202 or may be an integral component within the valve body 202. A detachably coupled anti-spin pin 402 is illustrated in FIG. 3.

The valve body 202 includes a hole 406 to removably receive the anti-spin pin 402. During assembly of the valve 102, the anti-spin pin 402 can be engaged with the hole 406. Subsequently, the spool 214 can be introduced into the valve body 202 in a downward direction 'Y', as shown in FIG. 4, thorough the bore 204. Once the spool 214 is introduced into the bore 204 and the second end 306 of the spool 214 is restricted by the anti-spin pin 402 for further inward movement, the spool 214 can be rotated about the longitudinal axis 'L' in incremental manner until the slots 322, or a single slot 322, engages with a shaft portion 408 of the anti-spin pin 402. In order to allow such engagement of the shaft portion 408 of the anti-spin pin 402 and the slots 322, diameter of the shaft portion 408 needs to be less than width of the slot 322, so that the spool 214 can be moved further inward in the downward direction 'Y'.

Alternatively, the spool 214 can be disposed in the bore 204 to an extent where the spool 214 cannot be moved any further in the downward direction 'Y'. At such a condition, an end surface 410 (shown in FIG. 3) defining a tip of the second end 306 of the spool 214 abuts a base 412 of the bore 204. Subsequently, the anti-spin pin 402 can be inserted through the hole 406 and the spool 214 can be rotated about the longitudinal axis 'L' until the shaft portion 408 of the anti-spin pin 402 is engaged with the slots 322. In order to minimize time required to achieve the engagement of the anti-spin pin 402 and the slots 322, the second end 306 of the spool 214 can include multiple slots 322 spaced apart by an angular distance. With such configuration, a small rotation angle of the spool 214 about the longitudinal axis 'L' can help achieve the engagement.

In some embodiments, an internal surface 404 of the bore 204 can include protrusions (not shown), such that the slots 322 are capable of engaging with the protrusions. With such construction, the internal surface 404 of the bore 204 includes the protrusions (not shown), the spool 214 can be rotated about the longitudinal axis 'L' in a similar fashion until the slots 322 can be engaged with the protrusions. In some examples, outer surface of the second end 306 of the spool 214 can include protrusions (not shown) extending along the longitudinal axis 'L' of the spool 214 instead of the slots 322, and the inner surface 404 of the bore 204 can include grooves (not shown) corresponding to the protrusions on the spool 214. Accordingly, when the spool 214 is inserted through the bore 204, the spool 214 can be restricted in further inward movement when the protrusions on the spool 214 are not aligned with the grooves on the internal surface 404 of the bore 204. In such condition, the spool 214 can be rotated about the longitudinal axis 'L' until the protrusions on the spool 214 are aligned with the grooves on the internal surface 404 of the bore 204. Subsequently, the spool 214 can be pushed in the downward direction Y.

In one embodiment, the spool 214 further includes a plug 414 disposed at the second end 306 of the spool 214, as shown in FIG. 2 and FIG. 4. In one example, the plug 414 can be a Straight Thread O-Ring (STOR) plug. The plug 414 includes a base portion 416 and a head portion 418 extending from the base portion 416. The head portion 418 of the plug 414 is engaged with the internal surface 404 at the second chamber 320. Outer diameter '$D_h$' of the head portion 418 can be predetermined, so that the head portion 418 can be rigidly fixed with the second chamber 320. As such, the plug 414 constitutes a sealing member at one end of the second chamber 320. The base portion 416 of the plug 414 and the base 412 of the bore 204 define a fourth chamber 420 at the second end 306 of the spool 214. The valve body 202 includes a port 422 that opens into the fourth chamber 420. Further, the valve 102 includes a solenoid 424 (shown in FIG. 2) coupled to the port 422. The solenoid 424 is configured to further control movement of the spool 214.

Figure 5:
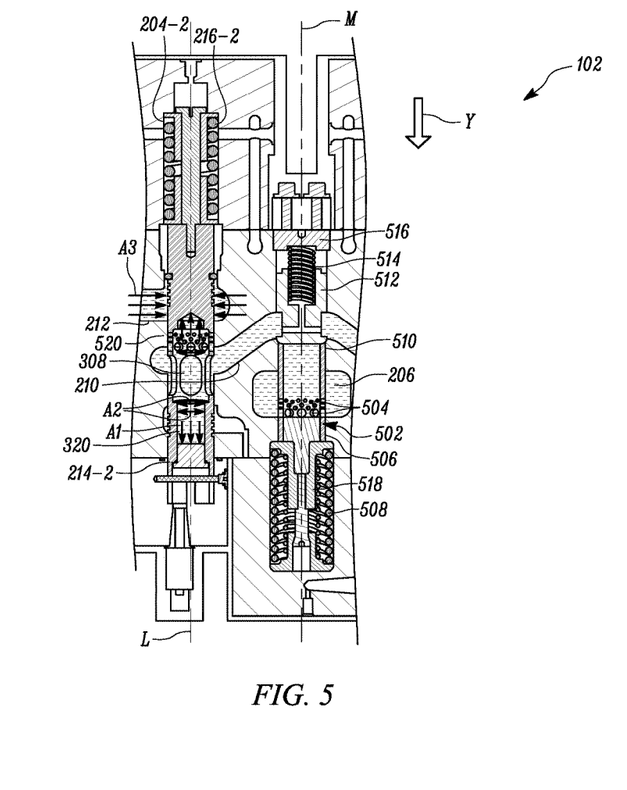
FIG. 5 is the cross-section of a portion of the hydraulic valve of FIG. 2 showing direction of flow of hydraulic fluid within the hydraulic valve, according to an embodiment of the present disclosure.

Referring to FIG. 5, a portion of the cross-section of the valve 102 indicating direction of flow of the fluid within the valve 102 is illustrated. In particular, FIG. 5 illustrates operation of the valve 102, according to an embodiment of the present disclosure. As described earlier, the valve 102 can be deployed in the hydraulic excavator to assist operation of the hydraulic actuators. At instances when a boom assembly of the hydraulic excavator is not being operated, but the actuating device 114 is kept running, the pump 106 is actuated by the actuating device 114 and hence the fluid from the tank 104 is pumped to the valve 102. The fluid is received into the valve 102 through the pump port 206. More specifically, the fluid is received into a movable member 502 through a plurality of apertures 504 provided in wall of the movable member 502, as shown in FIG. 5. In one example, the movable member 502 can be embodied as a spool.

A first end 506 of the movable member 502 is coupled to a spring member 508 of the valve 102. The spring member 508 includes two helical springs positioned coaxially, where pitch of an inner spring is less than pitch of an outer spring. A second end 510 of the movable member 502 is coupled to a sliding member 512 which is further coupled to a spring member 514. Further, the spring member 514 is disposed between a stopper 516 and the sliding member 512. Spring constant of the spring member 514 can be less than that of the spring member 508. As such, the spring member 514 deflects, that is, compresses, when the sliding member 512 moves towards the stopper 516. The spring member 508 can have a relatively high value of spring constant compared to that of the spring member 514, so that the springs deflect less when subjected to axial load During operation, the fluid being received within the movable member 502 causes a pressure rise in the movable member 502. The fluid exerts an axial thrust on the sliding member 512 and a flange member 518. Unless thrust exerted by the fluid on the flange member 518 is greater than biasing force of the spring member 508, the flange member 518 is not moved in the downward direction 'Y' to compress the spring member 508. However, since biasing force of the spring member 514 is less than that of the spring member 508, the axial thrust exerted by the fluid on the sliding member 512 causes the sliding member 512 to move towards the stopper 516. Such movement of the sliding member 512 allows fluid to enter the first flow passage 210 and flow towards the bore 204-2 and the bore 204-3, as shown in FIG. 5.

For the purpose of description, flow of the fluid into the second spool 214-2 is alone considered. The fluid associated with high pressure flows through the third set of holes 318 and into the first chamber 308 of the second spool 214-2. The first set of holes 314 and the second set of holes 316 are covered by a land portion 520 of the bore 204. Owing to the fluid communication of the second chamber 320 with the first chamber 308, the fluid received within the first chamber 308 flows to the second chamber 320 as well. Unless the thrust corresponding to pressure of the fluid within the first chamber 308 is greater than the biasing force of the second biasing member 216-2, the second spool 214-2 does not slide towards the second biasing member 216-2.

In such a condition when the pressure of the fluid within the second spool 214-2 is less than the biasing force of the second biasing member 216-2, the fluid exerts thrust on inner surface of the first chamber 308, which is indicated with the arrows 'A1' and 'A2'. While the arrows 'A1' are indicative of thrust exerted on the inner surface of the first chamber 308 in an axial direction along the longitudinal axis 'L', the arrows 'A2' are indicative of thrust exerted on the inner surface of the first chamber 308 in a radial direction perpendicular to the longitudinal axis 'L'. The first chamber 308 is configured to elongate along the longitudinal axis 'L' based on the pressure of the fluid. An outer surface 324 (shown in FIG. 3) of the first chamber 308 is configured to contract based on the elongation of the first chamber 308. The thrust, or force, indicated by the arrows 'A1' is greater than the thrust associated with the arrows 'A2'. Therefore, the elongation of the first chamber 308, or the elongation of the spool 214-2, overrides dilation of the outer diameter '$D_f$' of the first chamber 308, thereby allowing the spool 214-2 to elongate to an extent greater than radial contraction.

However, when the thrust corresponding to pressure of the fluid in the first chamber 308 is greater than the biasing force of the second biasing member 216-2, the spool 214-2 moves towards the second biasing member 216-2, thereby uncovering the first set of holes 314 and the second set of holes 316 from the land portion 520. Once at least one of the first set of holes 314 and the second set of holes 316 are uncovered, the fluid flows into the second flow passage 212 and towards the tank port 208-1. Further, the fluid received in the second flow passage 212 exerts a radial inward force, indicated by arrows 'A3', on the outer surface 324 of the spool 214-2. Since the end portion 310 of the spool 214-2 is made as the solid portion, the contraction (or, shrinkage) of the outer diameter '$D_f$' of the first chamber 308 can be overcome. Additionally, the plug 414 prevents contraction of the second chamber 320 of the spool 214-2. To this end, the high pressure fluid is allowed to flow from the pump port 206 to the tank port 208 via the spool 214-2.

Figure 6:
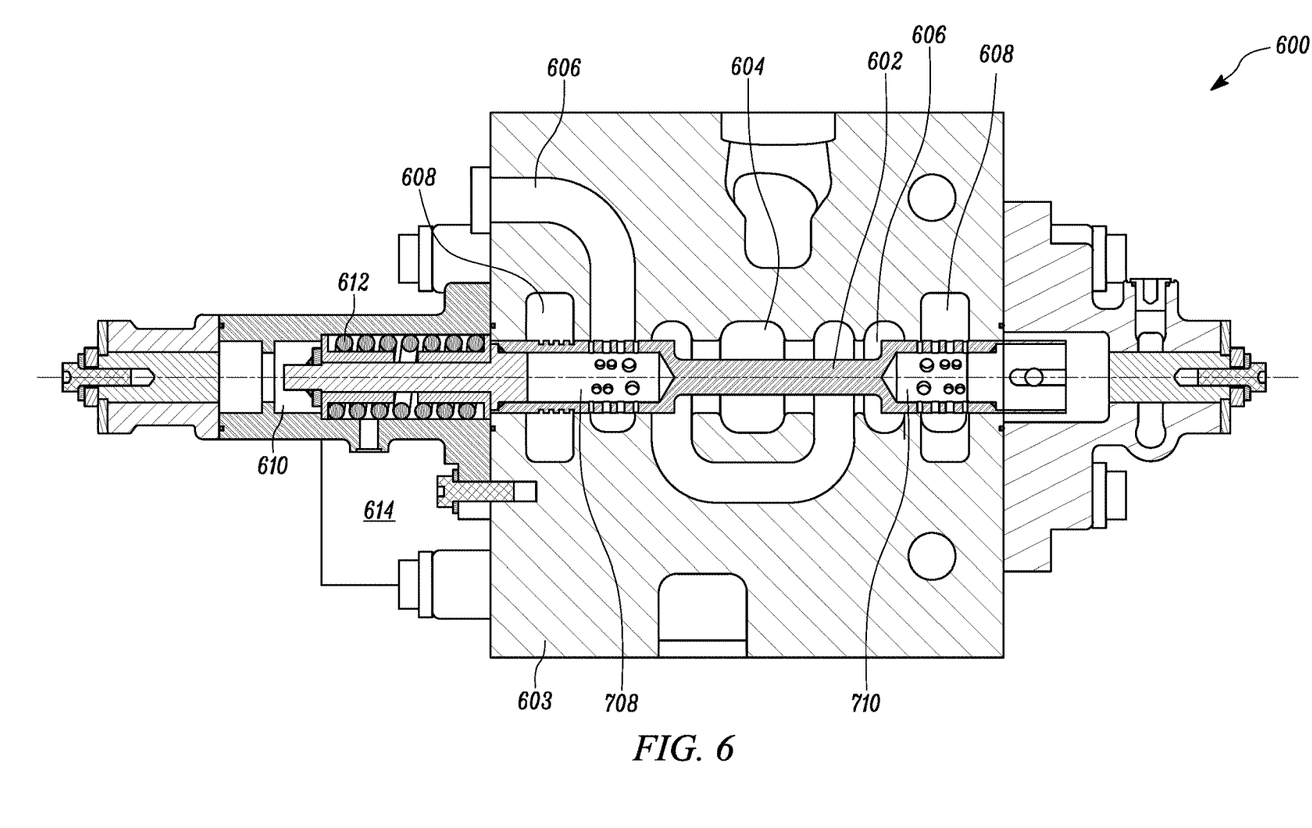
FIG. 6 is a cross-section of a hydraulic valve equipped with a spool, according to another embodiment of the present disclosure.

Referring to FIG. 6, a cross-section of a hydraulic valve 600 equipped with a spool 602, according to another embodiment of the present disclosure, is illustrated. For the convenience of description, the hydraulic valve 600 is hereinafter referred to as 'the valve 600'. Similar to the valve 102, the valve 600 also includes a valve body 603, a pump port 604 defined in the valve body 603, one or more delivery ports 606 defined in the valve body 603, and one or more tank ports 608 defined in the valve body 603. The valve 600 also includes a chamber 610 and a biasing member 612 disposed within the chamber 610. Further, the valve 600 includes a solenoid 614 coupled to the valve body 603.

Figure 7:
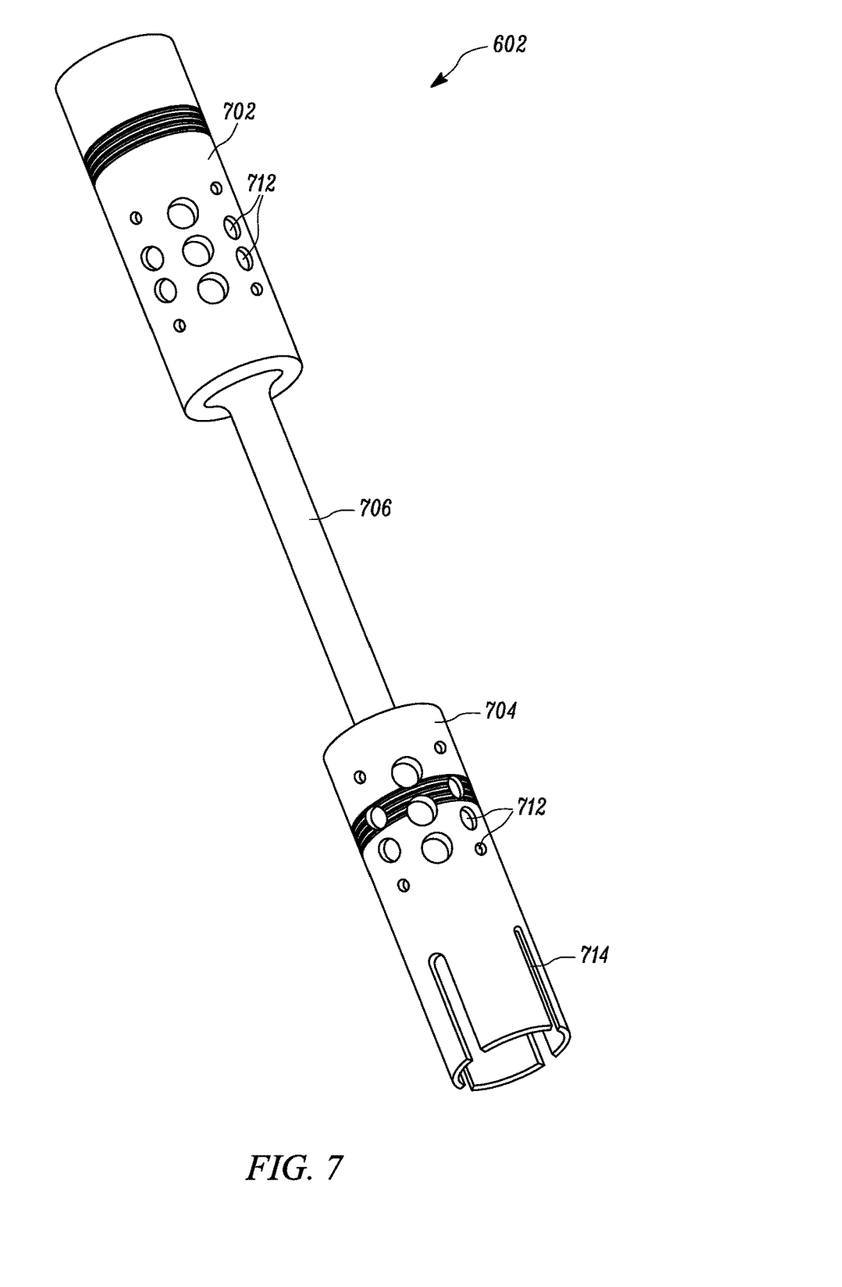
FIG. 7 is a perspective view of the spool of the hydraulic valve of FIG. 6, according to another embodiment of the present disclosure.

A perspective view of the spool 602 is illustrated in FIG. 7. The spool 602, embodied as a mono spool, includes a first portion 702, a second portion 704, and a stem 706 extending between the first portion 702 and the second portion 704. While the stem 706 is provided as a solid element, the first portion 702 and the second portion 704 are made hollow. That is, a first chamber 708 (shown in FIG. 6) is defined within the first portion 702 and a second chamber 710 (shown in FIG. 6) is defined within the second portion 704 of the spool 602. Wall of each of the first chamber 708 and the second chamber 710 is provided with a plurality of holes 712. Further, the second portion 704 includes multiple slots 714, individually referred to as 'the slot 714', formed in a manner similar to that of the previous embodiments described with respect to FIG. 3.

Figure 8:
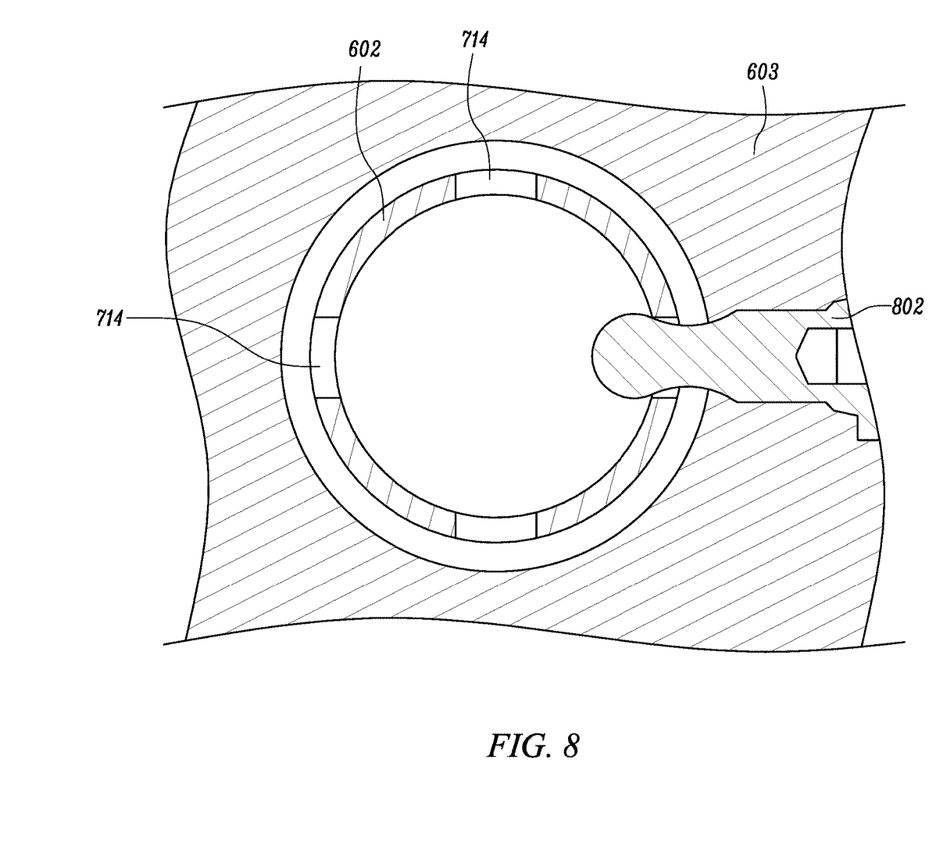
FIG. 8 is a cross-section of the spool of FIG. 7 equipped with an anti-spin pin, according to another embodiment of the present disclosure.

The valve 600 also includes an anti-spin pin 802, as illustrated in FIG. 8. The anti-spin pin 802 protrudes from the valve body 603 and is configured to engage with the slot 714. Manner in which the spool 602 can be assembled within the valve body 603 could be similar to that of the previous embodiment.

Figure 9:
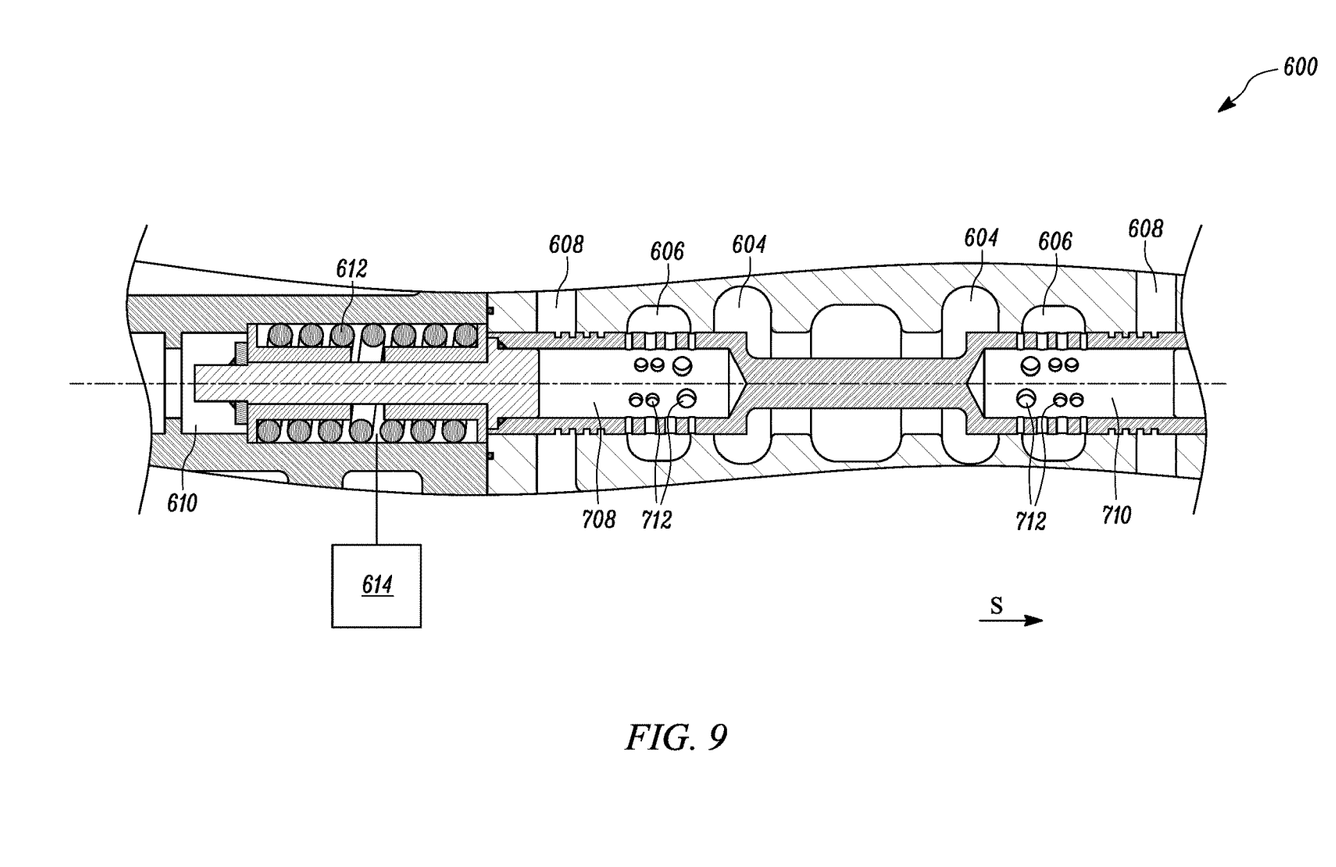
FIG. 9 is the cross-section of a portion of the hydraulic valve of FIG. 6 showing direction of flow of hydraulic fluid within the hydraulic valve, according to an embodiment of the present disclosure.

In operation, the solenoid 614 is configured to cause the biasing member 612 compress and allow the spool 602 to move in a direction 'S', as indicated in FIG. 9. The movement of the spool 602 in the direction 'S' causes the plurality of holes 712 defined in the first chamber 708 to be disposed in fluid communication with the pump port 604 and the second chamber 710 to be disposed in fluid communication with the tank port 608. As such, the spool 602 allows flow of fluid from the pump port 604 to the first chamber 708 and further to the delivery port 606. On the other end of the spool 602, the fluid entering the second chamber 710 from the delivery port 606 is allowed to flow to the tank port 608.

Various embodiments disclosed herein are to be taken in the illustrative and explanatory sense, and should in no way be construed as limitations to the present disclosure.

INDUSTRIAL APPLICABILITY

The present subject matter describes the spools 214 and 602 and valves 102 and 600 equipped with the spools 214 and 602 respectively. The valves 102 and 600 of the present disclosure can be deployed in various machines, which involve hydraulic systems for actuating movement of the components 112 of the machines. For instance, the valves 102 and 600 can be deployed in communication with the hydraulic system of the excavator machine to control movement of the boom assembly.

As described earlier with respect to FIG. 5, the high pressure fluid received within the first chamber 308 and the second chamber 320 of the spool 214 exerts axial forces, or thrust, (indicated by arrows A1 in FIG. 5) and radial forces (indicated by arrows A2 in FIG. 5) on the inner surface of the first chamber 308 and the second chamber 320. The spool 214 is designed in a manner such that the axial forces, which are responsible for elongation of the spool 214, are greater than the radial forces, which are responsible for dilation of the spool 214. In addition, the elongation of the spool 214 results in contraction of the outer surface 324 of the spool 214. As such, the spool 214 of the present disclosure allows elongation over dilation of the spool 214. Accordingly, seizure of the spool 214 is eliminated.

Besides the contraction of the spool 214 caused by the elongation event, fluid residing in the second flow passage 212 also exerts forces on the outer surface 324 of the spool 214. However, owing to the presence of the end portion 310 of the spool 214, which is provided as the solid portion, contraction (or, shrinkage) of the spool 214 is restricted. Additionally, the plug 414 disposed at the second end 306 of the spool 214 assists in limiting the contraction of the spool 214. Therefore, the spool 214 of the present disclosure eliminates any possibility of leakage of the fluid in the bore 204 of the valve 102.

Besides these features of the spool 214, the valves 102 and 600 include the anti-spin pins 402 and 802, as illustrated in FIG. 4 and FIG. 8, respectively. The anti-spin pins 402 and 802 are engaged with the slots 322 and 714 of the spools 214 and 602, respectively. Such engagement of the anti-spin pins 402 and 802 and the slots 322 and 714 of the spools 214 and 602 eliminate any possibility of development of spin of the spools 214 and 600, respectively, due to flow of high pressure fluid therethrough. To this end, the valves 102 and 600 of the present disclosure allow efficient control of the flow of fluid, which, in effect, allows efficient control of the components 112 of the machine, such as the boom assembly of the excavator.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A spool for a hydraulic valve, the spool comprising:
a cylindrical body having a first end a second end disposed opposite the first end along a longitudinal direction, and an annular wall defined by an internal surface of the cylindrical body and an external surface of the cylindrical body,
the annular wall defining a plurality of holes therethrough along a radial direction, the radial direction being perpendicular to the longitudinal direction,
the internal surface defining a first chamber, a second chamber, and a slot chamber within the cylindrical body, the second chamber being in fluid communication with the plurality of holes via the first chamber, the slot chamber being located between the second chamber and the second end of the cylindrical body and being blocked from fluid communication with the second chamber by a plug disposed within the cylindrical body,
the annular wall defining a slot therethrough, the slot extending from the second end of the cylindrical body toward the first end of the cylindrical body along the longitudinal direction, the slot being open at the second end of the cylindrical body along the longitudinal direction, an entirety of the slot being disposed between the plug and the second end of the cylindrical body along the longitudinal direction, the slot being in direct fluid communication with the slot chamber along the radial direction.

2. The spool of claim 1, wherein the slot is configured to engage with an anti-spin pin of a valve body of the hydraulic valve.

3. The spool of claim 1, wherein the plurality of holes includes a first set of holes and a second set of holes, the second set of holes being located between the first set of holes and the second end of the cylindrical body along the longitudinal direction, and
wherein a perimeter of each hole of the first set of holes is less than a perimeter of each hole of the second set of holes.

4. The spool of claim 1, wherein the internal surface of the cylindrical body terminates at an end of the first chamber along the longitudinal direction, such that the spool has a solid cross section in a radial plane between the first chamber and the first end of the cylindrical body.

5. The spool of claim 1, wherein the first chamber is configured to elongate along the longitudinal direction based on a fluid pressure within the first chamber,
wherein an outer surface of the first chamber is configured to contract based on the elongation of the first chamber, and
wherein an inner diameter of the second chamber is less than an inner diameter of the first chamber.

6. A hydraulic valve comprising:
a valve body defining at least one bore, at least one pump port, at least one tank port, a first flow passage in fluid communication with the at least one pump port and the at least one bore, and a second flow passage in fluid communication with the at least one tank port and the at least one bore;
at least one spool slidably disposed within the at least one bore of the valve body, the at least one spool being configured to selectively fluidly communicate with the first flow passage and the second flow passage, the at least one spool comprising:
a cylindrical body having a first end, a second end disposed opposite the first end along a longitudinal direction, and an annular wall defined by an internal surface of the cylindrical body and an external surface of the cylindrical body; and
at least one biasing member disposed within the valve body, and coupled to the first end of the cylindrical body of the at least one spool,
the annular wall defining a plurality of holes therethrough along a radial direction, the radial direction being perpendicular to the longitudinal direction,
the internal surface defining a first chamber, a second chamber, and a slot chamber within the cylindrical body, the second chamber being in fluid communication with the plurality of holes via the first chamber, the slot chamber being located between the second chamber and the second end of the cylindrical body and being blocked from fluid communication with the second chamber by a plug disposed within the cylindrical body,
the annular wall defining a slot therethrough, the slot extending from the second end of the cylindrical body toward the first end of the cylindrical body along the longitudinal direction, the slot being open at the second end of the cylindrical body along the longitudinal direction, an entirety of the slot being disposed between the plug and the second end of the cylindrical body along the longitudinal direction, the slot being in direct fluid communication with the slot chamber along the radial direction.

7. The hydraulic valve of claim 6 further comprising an anti-spin pin engaged with the slot of the at least one spool and the valve body to limit rotational motion of the at least one spool relative to the valve body.

8. The hydraulic valve of claim 6, wherein the plurality of holes comprises a first set of holes and a second set of holes, the second set of holes being located between the first set of holes and the second end of the cylindrical body along the longitudinal direction, and
wherein a perimeter of each hole of the first set of holes is less than a perimeter of each hole of the second set of holes.

9. The hydraulic valve of claim 8, wherein the internal surface of the cylindrical body terminates at an end of the first chamber along the longitudinal direction, such that the spool has a solid cross section in a radial plane between the first chamber and the first end of the cylindrical body.

10. The hydraulic valve of claim 6, further comprising a solenoid coupled to the second end of the cylindrical body of the at least one spool.

11. The hydraulic valve of claim 6, wherein the first chamber is configured to elongate along the longitudinal direction based on a fluid pressure within the first chamber, wherein an outer surface of the first chamber is configured to contract based on the elongation of the first chamber, and
wherein an inner diameter of the second chamber is less than an inner diameter of the first chamber.

12. A hydraulic system comprising:
a pump;
a tank; and
a hydraulic valve in fluid communication with the pump and the tank, the hydraulic valve comprising:
a valve body defining at least one bore, a first flow passage configured to communicate with the pump via at least one pump port, and a second flow passage configured to communicate with the tank via at least one tank port;
at least one spool slidably disposed within the at least one bore of the valve body, and configured to selectively communicate with first flow passage and the second flow passage, the at least one spool comprising:
a cylindrical body having a first end, a second end disposed opposite the first end along a longitudinal direction, and an annular wall defined by an internal surface of the cylindrical body and an external surface of the cylindrical body; and
at least one biasing member disposed within the valve body, and coupled to the first end of the cylindrical body of the at least one spool,
the annular wall defining a plurality of holes therethrough along a radial direction, the radial direction being perpendicular to the longitudinal direction,
the internal surface defining a first chamber, a second chamber, and a slot chamber within the cylindrical body, the second chamber being in fluid communication with the plurality of holes via the first chamber, the slot chamber being located between the second chamber and the second end of the cylindrical body and being blocked from fluid communication with the second chamber by a plug disposed within the cylindrical body,
the annular wall defining a slot therethrough, the slot extending from the second end of the cylindrical body toward the first end of the cylindrical body along the longitudinal direction, the slot being open at the second end of the cylindrical body along the longitudinal direction, an entirety of the slot being disposed between the plug and the second end of the cylindrical body along the longitudinal direction, the slot being in direct fluid communication with the slot chamber along the radial direction.

13. The hydraulic system of claim 12, wherein the hydraulic valve further comprises an anti-spin pin engaged with the slot of the at least one spool and the valve body to limit rotational motion of the at least one spool relative to the valve body.

14. The hydraulic system of claim 12, further comprising a solenoid coupled to the second end of the cylindrical body of the at least one spool.

15. The hydraulic system of claim 12, wherein the first chamber is configured to elongate along the longitudinal direction based on a fluid pressure within the first chamber,
wherein an outer surface of the first chamber is configured to contract based on the elongation of the first chamber, and
wherein an inner diameter of the second chamber is less than an inner diameter of the first chamber.

* * * * *